G. R. DAVIDSON.
GRAIN CLEANER.
APPLICATION FILED APR. 28, 1908.
917,016.
Patented Apr. 6, 1909.
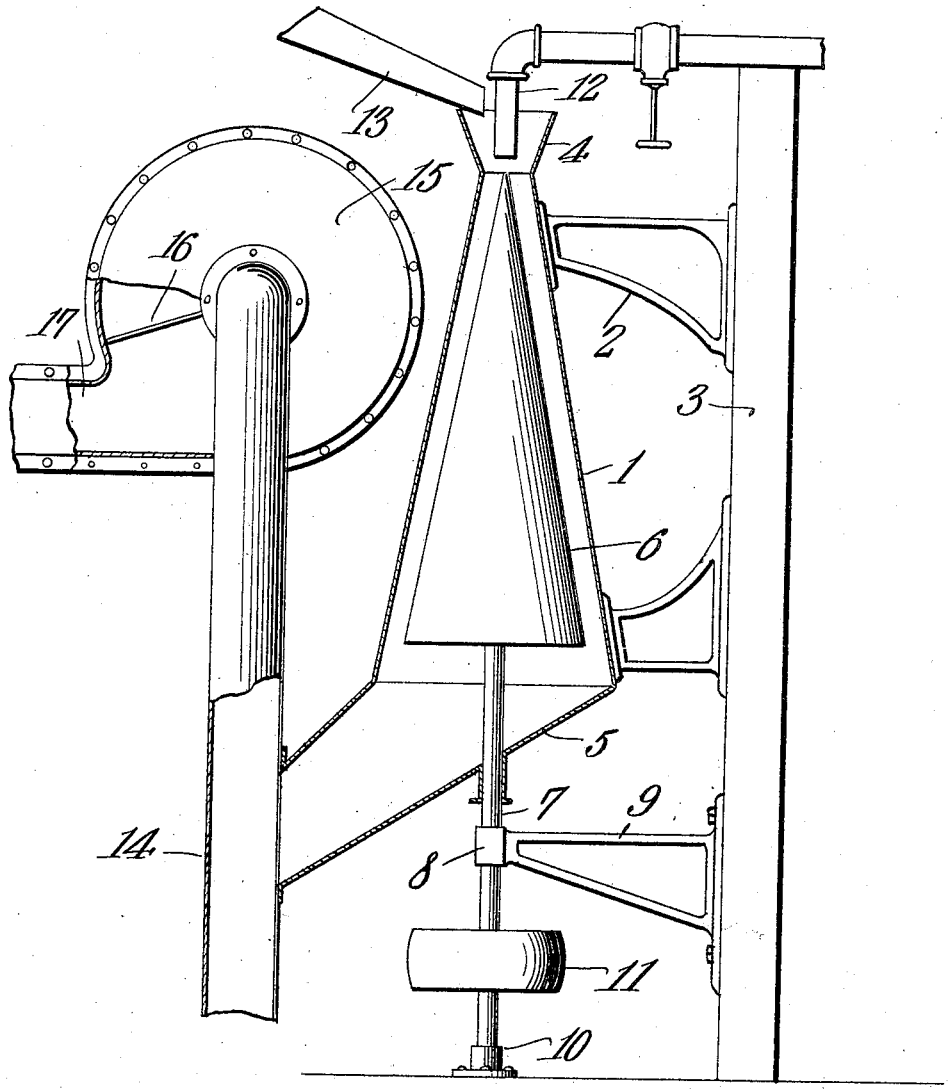
Witnesses
Inventor
George R. Davidson.
By C. A. Snow & Co.
Attorneys

UNITED STATES PATENT OFFICE.

GEORGE ROBERT DAVIDSON, OF LENOX, MICHIGAN.

GRAIN-CLEANER.

No 917,016.　　　Specification of Letters Patent.　　　Patented April 6, 1909.

Application filed April 28, 1908.　Serial No. 429,739.

*To all whom it may concern:*

Be it known that I, GEORGE R. DAVIDSON, a citizen of the United States, residing at Lenox, in the county of Macomb and State of Michigan, have invented a new and useful Grain-Cleaner, of which the following is a specification.

This invention has relation to machines for treating grain and it consists in the novel construction and arrangement of its parts as hereinafter shown and described.

The object of the invention is to provide a machine of simple construction which is adapted to be used to advantage for cleaning, scouring, polishing, peeling and pulverizing grain. With this object in view the machine consists of a conical beater journaled for rotation and which is surrounded by a conical or other form of casing spaced from the same. The said casing is provided at one end with a hopper or inlet for the grain. Said inlet is located at the forward end of the said casing. An air pipe adapted to discharge compressed air against the end of the beater terminates in the said hopper and the outlet of the said pipe is in alinement with the longitudinal axis of the beater. The said casing is provided with a chute which discharges into a vertically disposed pipe and a fan is connected with this pipe and is adapted to create suction through the same for the purpose of removing the refuse matter which has been separated from the grain kernels from the said kernels. Thus it will be seen that when the grain is introduced into the casing of the beater it is forced in contact with the beater by a blast of air or gas and in consequence of the force of the said blast it is caused to rebound between the beater and the inner side of the casing thereof. Thus the outer skin or pericarp of the seed is subjected to the force of impact against the sides of the beater and the casing and is eventually cracked and removed from the grain. Furthermore as the beater is rotating the grain is turned so that all sides are presented to the beater and inner surface of the casing during the passage of the same through the said casing. After the outer skin of the grain is cracked it is separated from the grain by the same action and thus the skin and the undesirable foreign matter located thereon is removed from the grain kernels.

In the accompanying drawings:—The figure is a vertical sectional view of the machine.

The casing 1 is conically shaped and is supported by the brackets 2 which in turn may be attached to an upright 3 or other fixed support. The hopper 4 is attached to the upper end of the casing 1 and the chute 5 is attached to the lower or larger end of the said casing 1. The conical beater 6 is concentrically arranged in the casing 1 and is mounted upon the shaft 7 and is journaled in a bearing 8 provided upon the bracket 9 and which is mounted at its lower end in a pillow-bearing 10. The belt pulley 11 is mounted upon the shaft 7. The upper pointed end of the beater 6 is located at the constricted end of the casing 1 and the longitudinal axis of the beater 6 is in alinement with the air-pipe 12. The said pipe 12 is adapted to discharge compressed air or gas into the casing 1 as will be hereinafter described. The grain-chute 13 has an outlet over the hopper 4. The chute 5 communicates with the vertically disposed pipe 14 and the upper end of the said pipe 14 connects with the fan-casing 15. The rotary fan 16 is located in the casing 15 and the casing is provided with a discharge outlet 17 which is approximately of the same transverse area as the transverse area of the pipe 14. While the beater 6 as shown in the accompanying drawing is arranged vertically it may be together with the casing 1 arranged horizontally to perform the same function.

The operation of the machine is as follows:—The air or gas under pressure is admitted into the casing 1 through the pipe 12. At the same time the grain is admitted into the hopper 4 through the grain-chute 13. As the said grain is caught up by the blast of air from the pipe 12 it is forcibly thrown against the sides of the beater 6, which is in a state of rotation and the grain rebounds from the sides of the beater against the inner side of the casing 1 during the course of its passage through the said casing. As the grain comes in contact with the sides of the beater and the casing the outer skin of the grain is cracked and removed therefrom and by reason of the fact that the said beater is rotating the grain is turned as it strikes the beater and thus all sides of the grain are presented to the walls against which the grain is thrown. When the material enters the chute 5 it passes into the pipe 14 and as the fan 16 is rotating a suction is created up through the pipe 14 and the grain kernels fall down through the said pipe 14 while the hulls or skin is carried up through the said pipe 14 in response to the suction created by the fan 15 and the refuse matter which is thus introduced into the casing 15 is discharged therefrom through the outlet 17.

Having described my invention what I claim as new and desire to secure by Letters Patent is:—

In a grain-hulling machine, a conical casing provided with a feed inlet and discharge opening, a conical impact beater spaced from said casing having an unobstructed impact surface and journaled for rotation in said casing, and having its apex presented to the inlet, and means for directing the material forcibly against the said beater, and means for rotating the beater.

In testimony that I claim the foregoing as my own, I have hereto affixed my signature in the presence of two witnesses.

GEORGE ROBERT DAVIDSON.

Witnesses:
WM. R. DAVIDSON,
JOSEPH M. WINKEL.